United States Patent [19]

Zuromski et al.

[11] Patent Number: 5,567,450
[45] Date of Patent: Oct. 22, 1996

[54] GUM BASE MANUFACTURING METHOD

[75] Inventors: Edward J. Zuromski, Bridgewater; James H. Campbell, Edison; George E. Yurish, Metuchen; Dinah Diaz, Colonia, all of N.J.

[73] Assignee: Wm. Wrigley Jr. Company, Chicago, Ill.

[21] Appl. No.: 486,682

[22] Filed: Jun. 7, 1995

[51] Int. Cl.⁶ ............................................. A23G 3/30
[52] U.S. Cl. ................................................... 426/5
[58] Field of Search ............................ 426/3–6, 516

[56] References Cited

U.S. PATENT DOCUMENTS

| | | | |
|---|---|---|---|
| 3,995,064 | 11/1976 | Ehrgott et al. | 426/3 |
| 4,305,962 | 12/1981 | Del Angel | 426/3 |
| 4,459,311 | 7/1984 | DeTora et al. | 426/3 |
| 5,045,325 | 9/1991 | Lesko et al. | 426/5 |
| 5,135,760 | 8/1992 | Degady et al. | 426/5 |
| 5,397,580 | 3/1995 | Song et al. | 426/5 |
| 5,486,366 | 1/1996 | Song et al. | 426/5 |

FOREIGN PATENT DOCUMENTS

| | | |
|---|---|---|
| 2635441 | 2/1990 | France . |
| 55-19014 | 9/1980 | Japan . |
| WO92/18016 | 10/1992 | WIPO . |

*Primary Examiner*—Jeanette Hunter
*Attorney, Agent, or Firm*—Brinks Hofer Gilson & Lione

[57] ABSTRACT

A process for manufacturing gum base that involves forming a pre-blend having a viscosity less than $2 \times 10^6$ cps where the pre-blend contains certain liquefiable gum base ingredients and certain dry powder ingredient(s). The pre-blend is transferred to a different mixer and then blended with elastomeric gum base components.

17 Claims, 3 Drawing Sheets

GUM BASE MANUFACTURING METHOD

BACKGROUND OF THE INVENTION

This invention relates to an improved process for the manufacture of gum bases. Specifically, this invention is a process where certain dry powder ingredients normally used in gum base formulations are pre-blended with liquefiable materials (e.g. elastomer plasticizers or molten waxes or softeners) before blending the dry ingredients into the elastomer component of the gum base.

Typical gum bases, particularly bubble bases include an elastomer component (e.g. styrene-butadiene rubber, polyvinyl acetate, natural rubber, and the like), softeners (e.g. fats, oils or mono- or diglycerides), waxes, elastomer plasticizers (e.g. rosin esters or terpene resins) and up to 60 percent of dry ingredients.

Formulations for gum bases vary widely and are based in part on customer requirements and specifications. Thus, conventional gum base manufacture can be relatively costly for some bases, because the economies of scale of large production runs cannot be achieved with some bases, because their formulae differ one from the another. Typically, a gum base is made on a production line that includes one or more gum base mixers and ingredient addition equipment. Once one base is made, new ingredients must be preweighed and delivered to the gum base mixers for manufacture of a different base. Thus, if a particular base has a short production run, there are proportionately higher costs due to the preparation and delivery of ingredients, that cause manufacturing delays.

In terms of weight percentages, the predominant type of dry ingredient in gum base is filler (e.g. talc or calcium carbonate), although important other dry ingredients such as flavorants (e.g. cocoa powder) and colorants are commonly used. Dry ingredients used in gum bases are almost invariably very fine (typically in powder form) so as not to impart a grainy texture to the ultimate product.

Unfortunately, the fine powder consistency of typical dry ingredient used in chewing gums can result in manufacturing problems. Even when the most advanced equipment is employed, such dry ingredients can become airborne.

Airborne powder from one gum base product can contaminate other gum base products being produced in the same plant. For example, some gum base products using acidic ingredients should not be exposed to calcium carbonate-containing fillers. Airborne contamination also necessitates frequent plant cleaning.

Finally, conventional processes for gum base manufacture can involve many individual blending steps, in some cases up to 30 or more separate additions of ingredients, depending upon the ingredients and equipment.

SUMMARY OF THE INVENTION

This invention is a process for large-scale gum base manufacture that allows different gum bases to be made from a common liquid pre-blend that includes certain liquefiable gum base ingredients and certain dry powder ingredients (e.g. fillers) so that the pre-blend is pumpable (i.e. has a viscosity less than about $2 \times 10^6$ cps).

Such a common pre-blend formed in a primary mixer can be pumped to one or more secondary mixers where the elastomeric components of gum bases are added so that the ratio of pre-blend to elastomer ranges from about 1:1 to 10:1. The elastomer and pre-blend are blended in the secondary mixers to form at least a first finished base.

However, at the same or different time(s), in secondary mixers, other finished gum base formulations can be made using the same pre-blend by (1) blending a different ratio of pre-blend and elastomer than used in the first finished base; (2) using different types of elastomeric compositions than used in the first finished base; (3) adding additional dry powder ingredients; and/or (4) adding additional liquefiable ingredients.

With such an operating scheme, the portion of the gum base plant devoted to primary mixing of the common pre-blend does not have to encounter manufacturing delays and increased labor costs associated with changeover due to other gum base formula manufacture. Furthermore, using a common pre-blend allows most of the dry powder ingredients to be added with large-scale, clean handling equipment to the liquefiable ingredients in the primary mixer(s). This can reduce airborne particulates in the plant, thus, among other things, reducing any cross-contamination of products.

A common pre-blend also allows for efficient utilization of secondary mixers. For production runs of large quantities of standard base formulations, at least a group of secondary mixers can be employed virtually continually to produce the same standard base formulation, reducing the need to clean secondary mixers between formulation changeovers. When lower-volume production runs of specialty bases is necessary, only certain of the secondary mixers would need to be employed, and cleaned between formulation changeovers.

DETAILED DESCRIPTION OF THE INVENTION

Figure 1:
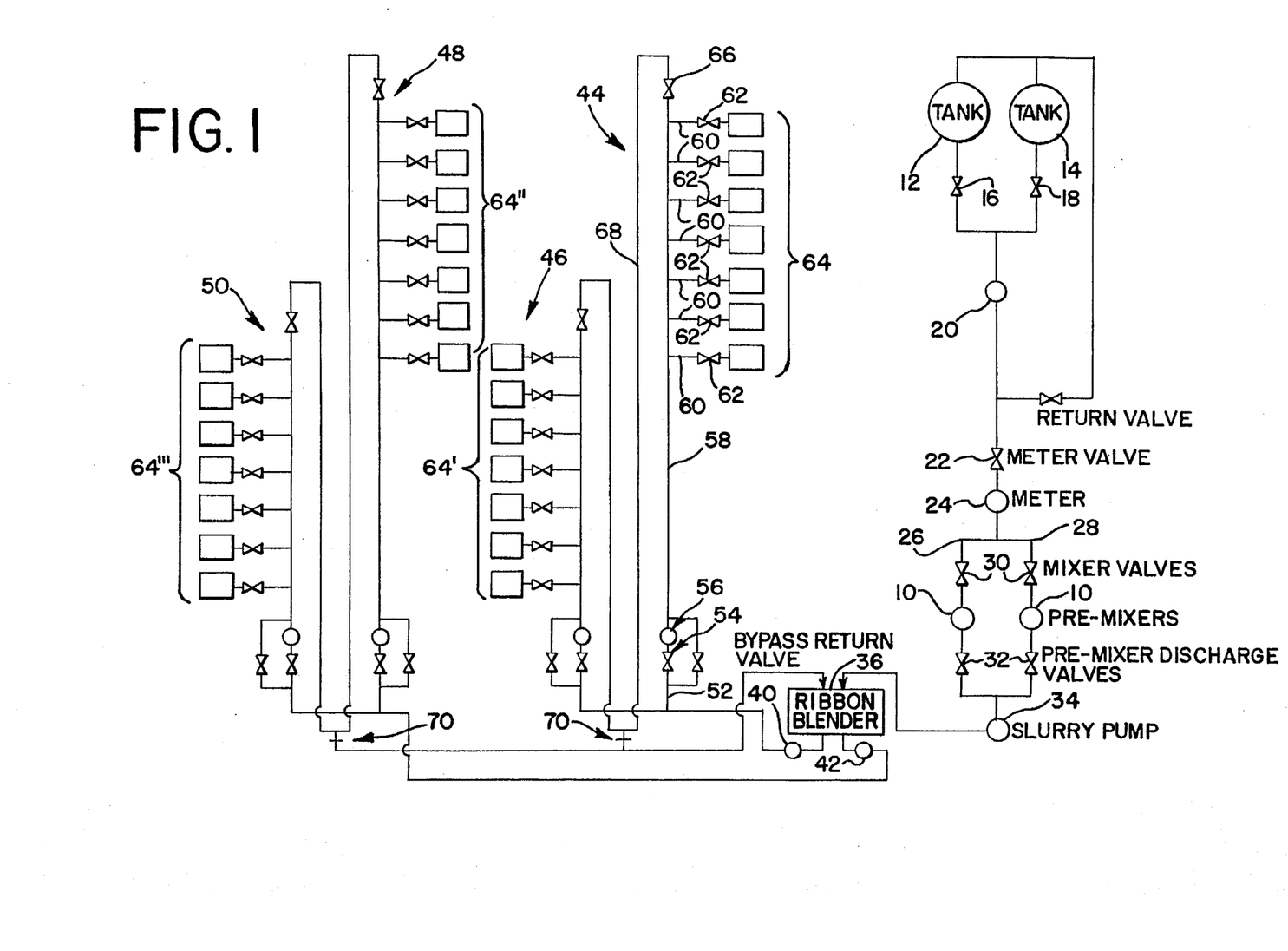
FIG. 1 is a schematic of a production plant in which the process of the present invention can be employed.

As shown in FIG. 1, a plant that can be used to practice the present invention is schematically shown. The plant includes plural primary mixers 10 into which dry powder ingredients are delivered via a powder delivery system such as that disclosed in U.S. Pat. No. 5,248,228, issued Sep. 28, 1993 to John C. Giardina, entitled "Apparatus For Conveying Powder" and is incorporated by reference. Primary mixers 10 also receive one or more liquefiable gum base ingredients from tanks 12 and 14 that are valved at 16 and 18. Tanks 12 and 14 are pumped by a pump 20 through a meter valve 22 and meter 24 where the flow is divided between lines 26 and 28 and fed through two meter valves 30 into primary mixers 10.

After dry powder ingredients are added to premixers 10 with the liquefiable gum base ingredients, the resultant product is in a liquid form having a viscosity less than about $2 \times 10^6$ cps so that the resultant pre-blend is pumpable through discharge valves 32 by a slurry pump 34 and into a ribbon blender or other mixer 36 which acts as an intermediate storage vessel to hold the pre-blend under agitation and preferably heat so that it remains pumpable.

The pre-blend is pumped out of blender 36 by pumps 40 and 42 that deliver the pre-blend through the piping shown in FIG. 1 to one or more secondary mixer rows 44, 46, 48, and 50. Piping is preferably insulated to prevent large amounts of heat loss. Tanks 12, 14, lines 26 and 28 and pumps 40, 42 can be used individually, one in place of the other, or concurrently, depending on gum base manufacturing needs.

Each of the secondary mixer rows is substantially the same as the others so only mixer row 44 will be described in any detail. The feed from pump 40 is received by line 52 and passes through a meter valve 54 through a meter 56 into a line 58 that is manifolded with a series of outlets 60 that are valved with valves 62 that permit the discharge of pre-blend into plural secondary mixers 64. Meters may be placed in lines 60 to regulate the amount of pre-blend added to each individual secondary mixer. In secondary mixers 64, the elastomeric component of the gum base is added such that the ratio of pre-blend to the elastomeric component ranges from about 1:1 to about 10:1. The elastomer and the pre-blend are then blended in mixers 64 to form a finished gum base in each of the secondary mixers 64.

Once an appropriate amount of pre-blend is dispensed into a mixer 64, the appropriate valve 62 is shut. If all the valves 62 are shut (or the majority are shut on a given secondary mixer row, e.g. mixer row 44), return valve 66 is opened to allow pre-blend to be pumped back through line 68 through a back pressure orifice 70 (to relieve any excess pressure) back to ribbon blender 36 for subsequent pumping of pre-blend to one or more of the secondary mixer rows 44, 46, 48, and 50.

The advantage of such an operation is that a standard flowable and pumpable pre-blend made in pre-mixers 10 can be used to make different gum bases in secondary mixers 64, 64', 64Δ, and 64'Δ. For example, all of the secondary mixers 64 through 64'Δ can be used to make one standard base simply by adding the same elastomer in the same proportions to the various secondary mixers. However, at the same or, different time, different base formulations can be made in one or more of the secondary mixer rows 44, 46, 48 and 50 by using a different ratio of pre-blend to elastomer than used in the first finished base mentioned above; using a different type of elastomer or elastomeric compositions than used in a first finished base; or adding additional dry powder ingredients and/or adding additional liquefiable ingredients to one or more of the mixers 64, 64', 64Δ, and 64'Δ.

Another advantage of the scheme illustrated in FIG. 1 is that colorants can be appropriately added to gum bases. Instead of adding colorant to mixers 64 through 64'Δ, a colorant can be added to the pre-blend in pre-mixers 10 such that a series of lots of the same base or a group of different gum bases all having the same color can be made in mixer 64 through 64'Δ such a consistent color can be achieved across a broad series of production lots of the same product or production lots of different products.

Then, when another pre-blend is made for a different series of gum bases, a different colorant can be added to produce a series of lots of the same product having the new color or a series of lots of different products having the different color.

The agents suitable for use as liquefiable ingredients in the pre-blend of this invention include but are not limited to waxes, (synthetic or petroleum) having melting points below about 115° C., elastomer plasticizers having softening points below about 115° C., triglycerides, monoglycerides, diglycerides, acetylated monoglycerides, and lecithin. Preferably, such liquefiable ingredients are elastomer plasticizers, softeners and monoglycerides.

Petroleum waxes aid in the curing of the finished gum made from the gum base as well as improve shelf-life and texture. Wax crystal size, when hard, also improves the release of flavor. Those waxes high in iso-alkanes have a smaller crystal size than those waxes high in normal-alkanes, especially those with normal-alkanes of carbon numbers less than 30. The smaller crystal size allows slower release of flavor since their is more hindrance of the flavor's escape from this wax versus a wax having larger crystal sizes.

Preferably, such petroleum waxes contain little if any normal-alkanes, (i.e. straight-chained alkanes) and contain predominantly iso-alkanes (i.e. branched-chain alkanes), having greater than about 30 carbons. Formulation of some pre-blends and gum bases of this type may result in gum bases being more homogeneous and that have ingredients exhibiting more compatibility with each other. This compatibility is believed to be the result of the branched nature of iso-alkanes physically interacting, on a molecular level, with the branched molecules of the other gum base ingredients.

In other words, preferred waxes are those of at least 10 mm2/s viscosity, greater than 600 average molecular weight and containing predominantly iso-alkanes, (i.e. randomly branched alkanes) of carbon lengths greater than 30. Those waxes not preferred are those of less than 10 mm2/s viscosity, less than 600 average molecular weight, containing predominantly normal-alkanes of carbon lengths less than and greater than 30 and some terminally branched iso-alkanes.

Synthetic waxes are produced by means atypical of petroleum wax production and thus are not considered petroleum wax for the purposes of the present invention. These synthetic waxes may be used in accordance with the present invention and may be included optionally in the gum base and in the inventive pre-blend.

The synthetic waxes may include waxes containing branched alkanes and copolymerized with monomers such as but not limited to propylene and polyethylene and Fischer-Tropsch type waxes. Polyethylene wax is not in the same category as polyethylene, a polymer polymerized from ethylene monomers. Rather, for the purposes of the present invention, polyethylene wax is a synthetic wax containing alkane units of varying lengths.

Most preferred pre-blends and gum bases are those free of wax, and that use liquefiable ingredients other than wax to prepare the pre-blend in accordance with the present invention.

Elastomer plasticizers (used to make pre-blends of this invention) vary the firmness of the finished gum base. Their specificity on elastomer inter-molecular chain breaking (plasticizing) along with their varying softening points are believed to cause varying degrees of finished gum firmness when used in a base. This may be important when one wishes to provide more elastomeric chain exposure to the alkanic chains of any waxes used.

Elastomer plasticizers suitable for use in the present invention include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin, synthetic elastomer plasticizers such as terpene resins derived from alpha-pinene, beta-pinene and/or d-limonene and mixtures thereof.

The elastomer plasticizers used may be of one type or of combinations of more than one. Typically, the ratios of one to the other are dependent on the respective softening point of each plasticizer, on effect of each on flavor release, and on the degree of tack each imparts to the gum. Ball and ring softening points of the rosin ester types described above can range from about 45 to about 120° C. Softening points of the terpene resins may range from about 60 to about 130° C. and may have an average molecular weight of from about 400 to 2000.

Occasionally, both terpene and rosin ester resins may be used in the present invention. The terpene:rosin ester ratios may range from about 1:15 to about 15:1. Preferably, for the present invention, natural rosin esters are used as elastomeric plasticizers.

Preferably, the elastomer plasticizers used in a gum base comprising the inventive pre-blend or in the inventive pre-blend itself are natural rosin esters such as glycerol ester of partially hydrogenated rosin, glycerol ester of rosin, glycerol ester of tall oil rosin, partially hydrogenated methyl esters of rosin, synthetic elastomer plasticizers such as terpene resins, and mixtures thereof.

More preferably, the elastomer plasticizers used are glycerol ester of partially hydrogenated rosin, glycerol ester of rosin, glycerol ester of tall oil rosin, synthetic elastomer plasticizers such as terpene resins derived from alpha-pinene, beta-pinene and/or d-limonene and mixtures thereof.

Triglycerides used in the pre-blend of this invention perform as softeners that modify texture, cause the hydrophobic and hydrophilic components of the base to be miscible, and may further plasticize the synthetic elastomers of the finished gum base. Triglyceride softeners suitable for use in the pre-blend of the present invention and in the gum base employing that pre-blend include triglycerides of non-hydrogenated, partially hydrogenated and fully hydrogenated cottonseed, soybean, palm, palm kernel, coconut, safflower, tallow, cocoa butter, and the like.

The preferred triglycerides include unsaturated, partially saturated or fully saturated oils that contain, as one or more of their constituent groups, fatty acids of carbon chain length of from 6 to 18.

More preferred triglycerides are those having a total saturated caproic, caprylic, capric, lauric, myristic and palmitic fatty acid content of from about 8 to about 60 percent by weight of the fatty acids, determined from the fatty acid methyl ester distribution by gas chromatography. The caproic, caprylic, capric, myristic, lauric and palmitic acids of the triglycerides also plasticize the synthetic elastomers more than triglycerides containing predominantly stearic fatty acid. As examples, triglycerides high in saturated lauric fatty acid more effectively plasticize the vinyl laurate/vinyl acetate copolymer, and those high in saturated palmitic fatty acid more effectively plasticize the polyvinyl acetate polymer, increasing the branching.

Monoglycerides, diglycerides, acetylated monoglycerides, distilled mono- and diglycerides and lecithin may, from their manufacturing processing, contain triglyceride levels less than 2 percent by weight. Any of these ingredients having triglycerides levels less than 2 percent by weight would not have a significant influence on the fatty acid distribution determined from gas chromatography analysis versus the other total triglycerides present and provided by the oils previously defined as being suitable for the present invention. Thus, these ingredients would not normally be considered as being of the same category as the other oils defined for the purposes of the present invention and may be optionally used in the inventive pre-blend or in the gum base employing the inventive pre-blend.

The "dry powder ingredients" as that term is used in this invention are fillers. Fillers modify the texture of the gum base and aid in processing. Fillers suitable for use in the pre-blend of the present invention include carbonate or precipitated carbonate types such as magnesium and calcium carbonate (e.g. ground limestone); and silicate types such as zirconium, magnesium, or aluminum silicate, clay, talc, mono-, di- and tricalcium phosphate, or mixtures thereof.

Talc filler is used for gums that contain acidic flavorants or that employ artificial sweeteners, since the acid flavor or an acidic environment is needed to prevent degradation of certain artificial sweeteners. Acids can react with and be neutralized by calcium carbonate-type fillers. Mean particle size for calcium carbonate or talc fillers of the present invention range from about 0.1 micron to about 15 microns. More preferably, the fillers used have a mean particle size range from about 0.4 to about 14 microns and are calcium carbonate and talc.

Filler particle size can have an effect on cohesiveness, density and processing characteristics of the gum base and its compounding. The smaller the particle size, the more dense and cohesive the final gum base is. Also, by selecting fillers based on their particle size distribution, initial mass compounding in the secondary mixers may be varied, thus allowing alteration of the compounding characteristics of the initial mass during gum base processing in the secondary mixers and ultimately the final chew characteristics of gums made from these gum bases.

As discussed below, one may wish to withhold a portion of the dry powder filler from the pre-blend and add this portion into the secondary mixes to facilitate compounding. For some gum bases, all the filler, in its dry powder form, is added to the pre-blend. This is acceptable for the purposes of the present invention since the pre-blend ingredients mass in a short time, thus allowing little chance for producing substantial airborne filler material. Regardless how much of the total filler is added to the pre-blend, the filler added to the pre-blend is done so in a single addition. Any remaining filler added to the secondary mixes is also added in a single addition. This eliminates the frequency of dry filler additions and thus results in one of the beneficial characteristics of the present invention, namely less airborne particulates.

Optional ingredients used in the pre-blend of this invention include flavorants and colorants. Flavorants suitable for use in the pre-blend of the present invention include cocoa powder. Cocoa powder provides synthetic gum base with enhanced flavor characteristics.

Colorants impart desired color characteristics or remove any undesired color by whitening of the base. Colorants suitable for use in the pre-blend of the present invention include FD&C-type lakes, plant extracts, fruit and vegetable extracts, titanium dioxide or mixtures thereof.

Preferably, the colorant and flavorant are FD&C lakes and cocoa powder respectively and are present at levels from about 0.5 percent to about 40 percent by weight of the pre-blend.

Preferably, the pre-blend comprises from about 40 percent to about 85 percent by weight of liquefiable gum base ingredients, in solid or liquid form, and from 15 percent to about 60 percent dry powder ingredients and more preferably comprises from about 45 percent to about 75 percent by weight of liquefiable gum base ingredients, in its solid or liquid form, and from about 25 percent to about 55 percent dry powder ingredient. By adding or maintaining heat to and optional agitation within the primary mixer so that the contents of the primary mixer are blended uniformly and at a temperature above the softening point or melting point of the agent, a viscosity of less than 2×10⁶ can be achieved. If the liquefiable agent is liquid at ambient temperature, then little if any heat is required. At the stated viscosity the pre-blend is removed from the primary mixers and delivered to the secondary mixer, preferably by mechanical pumping and more preferably, by computer-assisted pumping and metering of the pre-blend amount delivered.

By "viscosity," it is meant thermosel viscosity values determined by the Brookfield Thermosel Unit HBT DV-II Viscometer, supplied by Brookfield Engineering Labs, Stoughton, Mass. as per Brookfield's directions for that unit, using a sample size of 15 grams and using spindle number 29 at 10 rpm and 210° F.

Preferably, heat applied to the primary mixer 10 and/or ribbon blender 36 is sufficient enough to maintain the temperature of the pre-blend within the vessel at about 5 to 40 percent greater than the melting or softening point of the pre-blend. This additional amount of heat compensates for any heat loss experienced during delivery of the pre-blend to the secondary mixers.

The viscosity of the pre-blend within the primary mixers 10 and/or ribbon blender 36 may determine the rate of agitation needed to keep the powdered ingredient and the liquefiable ingredient(s) homogeneously blended. When liquid or molten, the softeners such as triglycerides and the waxes will have far less viscous nature than elastomer plasticizers and, therefore, would tend to require a higher rate of agitation and a lower motor horsepower or amperage (throughput) requirement, (e.g. in the primary mixers 10 or ribbon blender 36) to keep the powders from settling out of the pre-blend. Preferably, a paddle blade is used to agitate the pre-blend.

In the secondary mixers, preferably the elastomeric component is added initially without pre-blend, and is permitted to compound (or mix) into a mass, preferably with an amount of filler and elastomer plasticizer to facilitate that compounding. This initial mass in the secondary mixers before pre-blend addition comprises preferably about 30 to 60 percent filler, about 20 to 40 percent elastomer, and about 10 to 30 percent elastomer plasticizer by weight. Typically, the ratio is about 2:3:1 elastomer: filler: elastomer plasticizer. While this may initially appear contrary to the advantages of a pre-blend in terms of filler delivery problems, the fact is, this type of secondary mixing permits filler to be added all at one time in the secondary mixers, eliminating stepwise, slow addition of filler common in the art in prior processing that creates such powder delivery problems.

The preferred elastomers for use in a gum base utilizing the pre-blend of this invention are the synthetic elastomers which include butadiene-styrene copolymers and isobutylene-isoprene copolymers, polybutadiene and polyisobutylene, vinyl polymeric elastomers such as polyvinyl acetate, polyethylene, vinyl copolymeric elastomers such as vinyl acetate/vinyl laurate, vinyl acetate/vinyl stearate, ethylene/ vinyl acetate, polyvinyl alcohol or mixtures thereof.

More preferably, the synthetic elastomers used are butadiene-styrene copolymers and isobutylene-isoprene copolymers, polyisobutylene, polyvinyl acetate, polyethylene, or mixtures thereof. These preferred elastomers may be used in their native solid chunk form, or may be pre-shredded or ground prior to use in the gum base.

Also, before pre-blend is added to a secondary mixer optional ingredients such as vinyl polymer or copolymer can be added. Other optional ingredients such as antioxidants may also be used in the gum base.

Antioxidants prolong shelf-life and storage of gum base, finished gum or their respective components including fats and flavor oils. Antioxidants suitable for use in gum base include butylated hydroxyanisole (BHA), butylated hydroxytoluene (BHT), beta-carotenes, tocopherols, acidulants such as Vitamin C, propyl gallate, other synthetic and natural types or mixtures thereof. Preferably, the antioxidants used in the gum base comprising the pre- blend of the present invention are butylated hydroxyanisole (BHA), butylated hydroxytoluene (BHT), tocopherols, or mixtures thereof.

Once that initial mass is homogeneously blended in the secondary mixers, the pre-blend from the primary mixers (or the ribbon blender) is then added in a stepwise fashion. Preferably, 10 to 30 percent of the total amount of pre-blend is added at this time. Preferably, the remaining pre-blend is added in 2 to 6 additions after that time, in amounts greater in weight toward the later additions and lesser in weight during the earlier additions.

The use of a pre-blend in accordance with the present invention allowed a reduction of base processing time from 1½ to 2½ hours for one standard base to 50 minutes to about 1½ hours of the same composition using the process of the invention.

The amount of pre-blend added to the secondary mixers ranges from about 5 percent to about 80 percent by weight of the finished base. Preferably, the amount of pre-blends ranges from about 5 percent to about 70 percent by weight of the finished base, and more preferably from about 10 percent to about 60 percent by weight of the finished base.

The addition of the pre-blend to the initial mass in the secondary mixers is preferably in a liquid form. It may be added stepwise, or continuously over the course of the base processing. More preferably, the pre-blend is added in its liquid form, via computer-aided mechanical delivery and in the stepwise manner described above. The heat applied to the gum base mixer during gum base manufacture may be eliminated at some point during the manufacturing process to allow cooling of the gum base. This cooling may allow some gum base ingredients, and the inventive pre-blend used in some gum bases, to blend into the gum base mass more easily. At times of high volume addition of pre-blend to certain gum bases, the elimination of heat is beneficial and preferably occurs at the start or near the end of the pre-blend addition. Preferably the heat is left on.

A gum base made by a conventional process was prepared and its rheological characteristics compared to a gum base made in accordance with the present invention. The bases in this comparison showed similar if not identical rheological data, indicating that the use of the inventive pre- blend alters the characteristics of the final gum base little, if any. Example 1 illustrates an embodiment of the present invention.

EXAMPLE 1

| Weight % | Ingredient | Conventional Process | Time | Process with Pre-blend | Time |
| --- | --- | --- | --- | --- | --- |
| 14.0 | Styrene-Butadiene | 130.0 | Start | 130.0 | Start |

-continued

| | Elast. | | | | |
|---|---|---|---|---|---|
| 33.0 | CaCO₃ Filler | 150.0 | Start | 150.0 | Start |
| 35.0 | Rosin Ester | 53.0 | Start | 53.0 | Start |
| | CaCO₃ Filler | 50.0 | 00:30 | ¼ Pre-blend* | 00:30 |
| | Rosin Ester | 32.0 | 00:30 | ¼ Pre-blend* | 00:36 |
| | CaCO₃ Filler | 50.0 | 00:45 | ¼ Pre-blend* | 00:42 |
| | Rosin Ester | 32.0 | 00:45 | ¼ Pre-blend* | 00:52 |
| | CaCO₃ Filler | 58.0 | 01:00 | | |
| | Rosin Ester | 85.0 | 01:00 | | |
| | Rosin Ester | 85.0 | 01:10 | | |
| | Rosin Ester | 39.0 | 01:20 | | |
| 15.0 | Wax | 140.0 | 01:30 | 140.0 | 01:00 |
| 3.0 | Softener | 28.0 | 01:30 | 28.0 | 01:00 |
| 0.06 | BHT | 0.6 | 01:30 | 0.6 | |
| 01:00 | | 932.6 | 01:45 | 932.6 | 01:15 |
| 100% | | lbs. | hours | lbs. | total hours |

Figure 2:
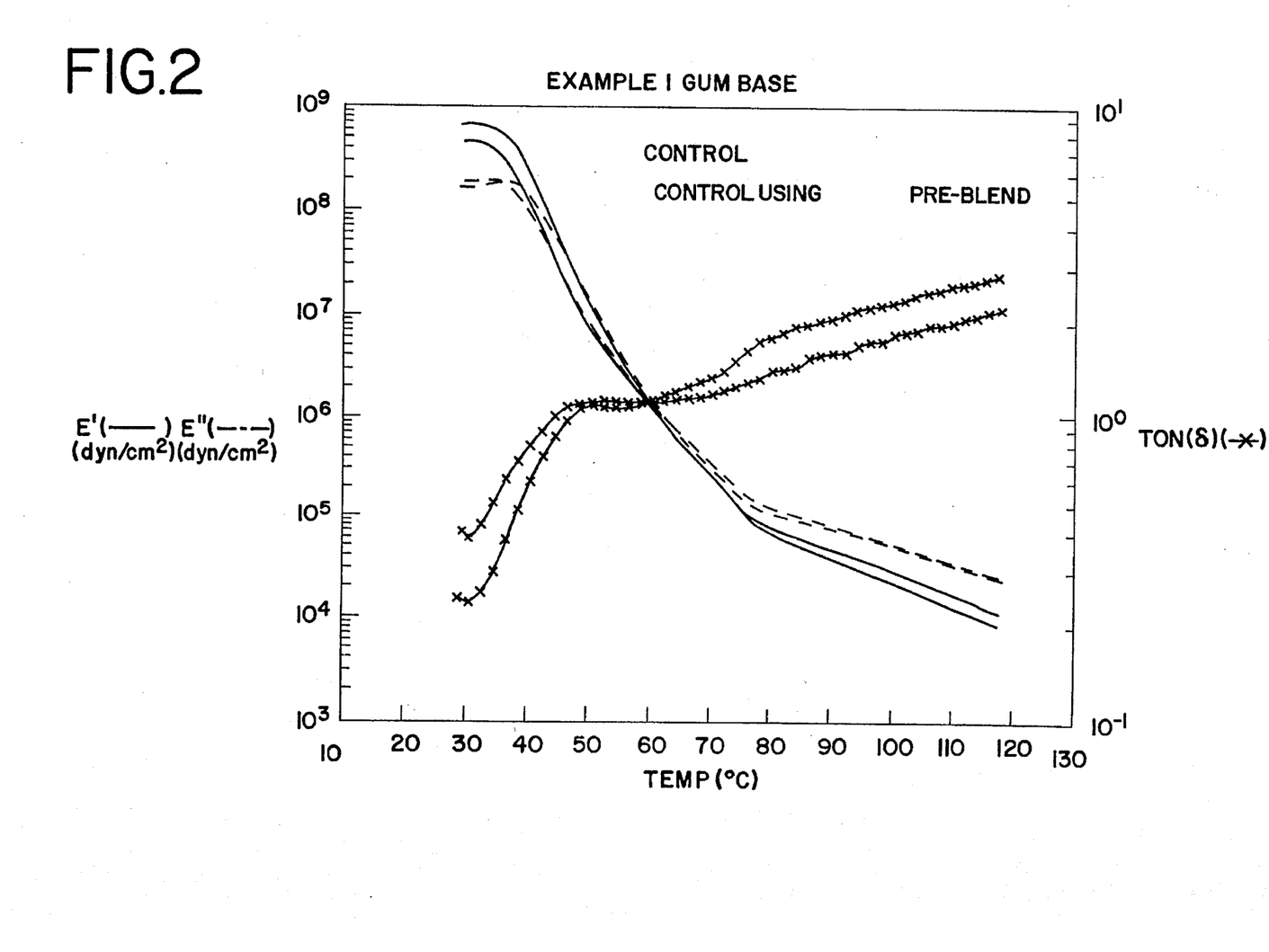
FIG. 2 is a graph comparing the rheological properties of gum base made according to a conventional process and a gum base made according to the process of this invention.

*Pre-Blend comprises:

| 40.0 | CaCO₃ |
|---|---|
| 60.0 | Rosin Ester |
| 100% | | plateau zone, (75–120°) the novel gum base produced a slightly higher storage modulus, G', and a lower tangent delta, the ratio of G' to GΔ, the loss modulus.

The higher transition and plateau moduli indicate the novel gum base made with a pre-blend may be slightly firmer than the control. The difference between the two bases is small and should not cause detectable differences in chewing or processing properties.

The modulus of the gum base produced drops smoothly over the temperature range tested and tangent delta shows no major changes in peak position or magnitude. This indicates that the gum base made the process of this invention is well blended with no phase separation.

Figure 3:
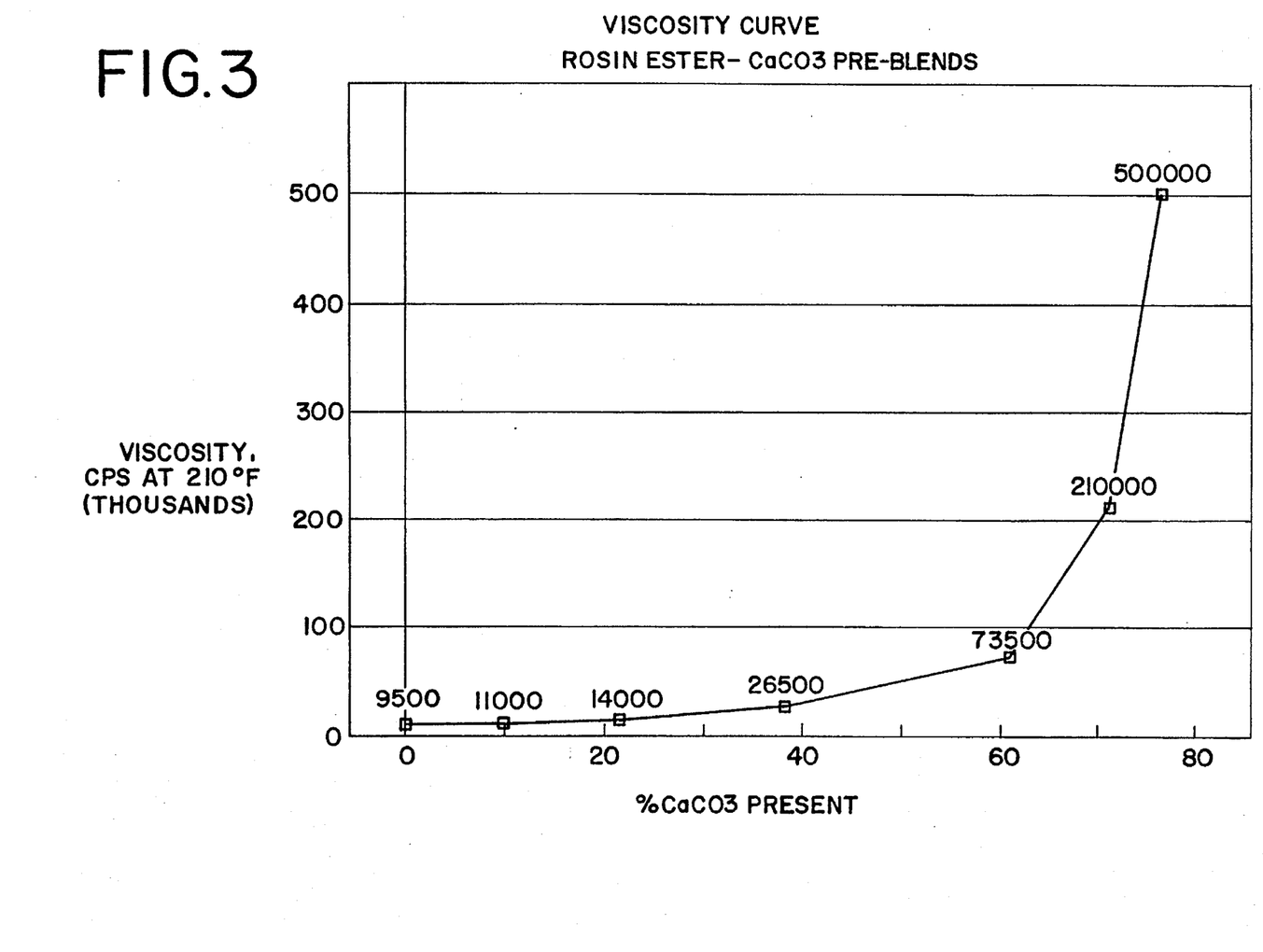
FIG. 3 is a graph of the thermosel viscosity of several pre-blends of this invention.

FIG. 3 illustrates the thermosel viscosity (cps) of one embodiment of a pre-blend. Calcium carbonate of increasing levels were blended with natural rosin ester. This graph indicates that at an 80 percent $CaCO_3$ level, the viscosity value would be acceptable for preferable pump delivery to the mixer during the gum base and gum making process.

Examples are shown in Tables 1A–E and 2. A number of them exemplify embodiments of the present invention and in no way are presented to limit the scope of the present invention.

TABLE 1A

EXAMPLES: PRE-BLEND (in % by weight of blend)

| EXAMPLE: | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Dry Powders | ... | ... | ... | ... | ... | ... | ... | | | | | | | | | |
| CaCO3 | 10 | 20 | 30 | 50 | 20 | 40 | — | — | — | — | — | 20 | 30 | 60 | 70 | — |
| Talc | — | — | — | — | — | — | 10 | 40 | 20 | 30 | 50 | — | — | — | — | 75 |
| Colorants | | | | | | | | | | | | | | | | |
| Cocoa Powder | | | | | | | | | | | | | | | | |
| Elast. Plast. | ... | ... | ... | ... | ... | ... | ... | | | | | | | | | |
| Rosin Esters | 90 | 80 | 70 | 50 | — | — | 90 | 60 | — | — | 30 | 50 | 20 | 30 | 10 | 25 |
| Terpene Resins | — | — | — | — | 80 | 60 | — | — | 80 | 70 | 20 | 20 | 50 | 10 | 20 | — |

| EXAMPLE: | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| Dry Powders | ... | ... | ... | ... | ... | ... | ... | | | | | | | | | |
| CaCO3 | | | | | | | | | | | | | | | | |
| Talc | | | | | | | | | | | | | | | | |
| Colorants | 2 | 5 | 10 | 20 | 30 | 50 | 70 | — | — | — | — | — | — | — | — | — |
| Cocoa Powder | — | — | — | — | — | — | — | 2 | 4 | 7 | 10 | 15 | 25 | 40 | 30 | 75 |
| Elast. Plast. | ... | ... | ... | ... | ... | ... | ... | | | | | | | | | |
| Rosin Esters | 98 | — | 90 | — | — | 20 | 20 | — | 96 | 63 | 50 | — | 75 | 60 | 25 | 25 |
| Terpene Resins | — | 95 | — | 80 | 70 | 30 | 10 | 98 | — | 30 | 40 | 85 | — | — | 25 | — |

| EXAMPLE: | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| Dry Powders | ... | ... | ... | ... | ... | ... | ... | | | | | | | | | |
| CaCO3 | 20 | 20 | 30 | 5 | 10 | 15 | 40 | — | 30 | 20 | 30 | 26 | 20 | 20 | — | 10 |
| Talc | 10 | 30 | 30 | 5 | 5 | 15 | 10 | 20 | — | — | — | — | 5 | — | 30 | — |
| Colorants | | | | | | | | 2 | 5 | 10 | — | — | — | — | — | — |
| Cocoa Powder | | | | | | | | — | — | — | 1 | 4 | 7 | 10 | 14 | 30 |
| Elast. Plast. | ... | ... | ... | ... | ... | ... | ... | | | | | | | | | |
| Rosin Esters | 70 | 50 | — | — | 35 | 50 | 50 | 78 | 65 | 70 | — | 70 | 68 | — | — | 60 |
| Terpene Resins | — | — | 40 | 90 | 50 | 20 | — | — | — | — | 69 | — | — | 70 | 56 | — |

FIG. 2 illustrates the shifting of the transition zone (30–50° C.) approximately 4° C. to higher temperatures for the gum base made with a pre-blend than for the control gum base made according to conventional processing. In the

TABLE 1B

PRE-BLEND

| EXAMPLE: | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Dry Powders | ... | ... | ... | ... | ... | ... | ... | | | | | | | | | | |
| CaCO3 | 10 | 20 | 26 | 30 | 35 | 50 | 75 | — | — | — | — | — | — | 5 | 10 | 8 | 15 |
| Talc | — | — | — | — | — | — | — | 5 | 10 | 14 | 35 | 60 | 70 | 5 | 20 | 4 | 15 |
| Colorants | | | | | | | | | | | | | | | | | |
| Cocoa Powder | | | | | | | | | | | | | | | | | |
| Other | | | | | | | | | | | | | | | | | |
| Wax | ... | ... | ... | ... | ... | ... | ... | | | | | | | | | | |
| >600 Mw | 90 | — | 74 | 70 | — | 30 | 10 | 95 | — | 86 | 65 | 10 | 25 | — | 70 | 50 | 20 |
| <600 Mw | — | 80 | — | — | 65 | 20 | 15 | — | 90 | — | — | 40 | 5 | 90 | — | 38 | 40 |

| EXAMPLE: | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| Dry Powders | ... | ... | ... | ... | ... | ... | ... | | | | | | | | | | |
| CaCO3 | | | | | | | | | | | | | | | 25 | 30 | — |
| Talc | | | | | | | | | | | | | | | — | — | 50 |
| Colorants | 2 | 4 | 5 | 10 | 25 | 60 | — | — | — | — | — | — | — | — | 5 | — | — |
| Cocoa Powder | — | — | — | — | — | — | 1 | 2 | 4 | 7 | 10 | 20 | 40 | 75 | — | 20 | 10 |
| Other | | | | | | | | | | | | | | | | | |
| Wax | ... | ... | ... | ... | ... | ... | ... | | | | | | | | | | |
| >600 Mw | 98 | 96 | — | 90 | 40 | 10 | 99 | — | 96 | 45 | 90 | 50 | 60 | — | — | 50 | 30 |
| <600 Mw | — | — | 95 | — | 35 | 30 | — | 98 | — | 48 | — | 30 | — | 25 | 70 | — | 10 |

TABLE 1C

PRE-BLEND

| EXAMPLE: | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Dry Powders | ... | ... | ... | ... | ... | ... | ... | | | | | | | | | | | | | |
| CaCO3 | 5 | 10 | 20 | 22 | 30 | 46 | 74 | — | — | — | — | — | — | 10 | 20 | 25 | 20 | 25 | 10 | |
| Talc | — | — | — | — | — | — | — | 10 | 12 | 21 | 34 | 55 | 75 | 5 | 5 | 10 | 40 | 50 | 55 | |
| Colorants | | | | | | | | | | | | | | | | | | | | 1 |
| Cocoa Powder | | | | | | | | | | | | | | | | | | | | — |
| Other | | | | | | | | | | | | | | | | | | | | |
| Softeners - Fully Hydrog. | ... | ... | ... | ... | ... | ... | ... | | | | | | | | | | | | | |
| Soybean Oil | 95 | — | — | — | — | — | — | — | 88 | 39 | — | 25 | — | — | 35 | — | 20 | — | 15 | 50 |
| Cottonseed Oil | — | 90 | — | 78 | — | — | — | — | — | 40 | — | 20 | — | 65 | 30 | — | 20 | — | 15 | 49 |
| Palm Oil | — | — | — | — | 70 | — | 21 | — | — | — | 66 | — | — | — | 10 | — | — | 25 | 5 | — |
| Palmkernel Oil | — | — | 80 | — | — | — | — | 90 | — | — | — | — | — | 20 | — | 20 | — | — | — | — |
| Coconut Oil | — | — | — | — | — | 54 | — | — | — | — | — | — | 25 | — | — | 10 | — | — | — | — |
| Safflower Oil | — | — | — | — | — | — | — | — | — | — | — | — | — | — | — | 35 | — | — | — | — |
| Tallow Oil | — | — | — | — | — | — | 5 | — | — | — | — | — | — | — | — | — | — | — | — | — |

| EXAMPLE: | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| Dry Powders | ... | ... | ... | ... | ... | ... | ... | | | | | | | | | | | | | |
| CaCO3 | | | | | | | | | | | | | | | | | 30 | 25 | | |
| Talc | | | | | | | | | | | | | | | | | — | — | | |
| Colorants | 2 | 5 | 10 | — | — | — | 21 | 35 | 45 | — | — | — | — | — | 10 | 5 | — | — | 34 | |
| Cocoa Powder | — | — | — | 2 | 5 | 7 | — | — | — | 12 | 25 | 30 | 50 | 70 | 10 | 20 | 20 | 40 | | 32 |
| Other | | | | | | | | | | | | | | | | | | | | |
| Softeners - Fully Hydrog. | ... | ... | ... | ... | ... | ... | ... | | | | | | | | | | | | | |
| Soybean Oil | 30 | 95 | 35 | — | — | 93 | 79 | — | 25 | 88 | — | — | — | — | 50 | — | — | — | | |
| Cottonseed Oil | 68 | — | 35 | — | 80 | — | — | 65 | 20 | — | 75 | 60 | — | 20 | — | 75 | 50 | 30 | 66 | 68 |
| Palm Oil | — | — | 20 | — | 10 | — | — | — | 10 | — | — | 10 | — | — | — | — | — | 5 | | |
| Palmkernel Oil | — | — | — | 98 | — | — | — | — | — | — | — | — | 50 | — | — | — | — | — | | |
| Coconut Oil | — | — | — | — | 5 | — | — | — | — | — | — | — | — | — | — | — | — | — | | |
| Safflower Oil | — | — | — | — | — | — | — | — | — | — | — | — | — | — | — | 30 | — | — | | |
| Tallow Oil | — | — | — | — | — | — | — | — | — | — | — | — | — | 10 | — | — | — | — | | |

TABLE 1D

| EXAMPLE: | | | | | | PRE-BLEND | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Dry Powders | ... | ... | ... | ... | ... | ... | ... | ... | | | | | |
| CaCO3 | 10 | 30 | 70 | — | — | — | 40 | — | — | 30 | — | 40 | 50 |
| Talc | — | — | — | 10 | 20 | 60 | 10 | — | — | — | 30 | | |
| Colorants | | | | | | | | 5 | — | — | | | |
| Cocoa Powder | | | | | | | | — | 15 | 20 | | | |
| Softeners - Part. Hydrog. | ... | ... | ... | ... | ... | ... | ... | ... | | | | | |
| Soybean Oil | — | — | 30 | 90 | 30 | 15 | — | — | 85 | 20 | — | — | |
| Cottonseed Oil | 90 | 70 | — | — | 50 | 15 | 45 | 95 | — | — | 60 | 50 | |
| Palm Oil | — | — | — | — | — | 10 | 5 | — | — | 10 | — | 10 | |
| Palmkernel Oil | — | — | — | — | — | — | — | — | — | 10 | — | — | |
| Coconut Oil | — | — | — | — | — | — | — | — | — | 10 | 10 | — | |
| Safflower Oil | — | — | — | — | — | — | — | — | — | — | — | — | |
| Tallow Oil | — | — | — | — | — | — | — | — | — | — | — | — | |

TABLE 1E

| EXAMPLE: | | | | | | PRE-BLEND | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Dry Powders | ... | ... | ... | ... | ... | ... | ... | ... | | | | | | | | | |
| CaCO3 | 20 | 40 | 60 | — | — | — | — | — | — | — | 25 | 45 | — | 60 | — | — | |
| Talc | — | — | — | 10 | 30 | 70 | — | — | — | — | — | — | 65 | — | 50 | — | |
| Colorants | — | — | — | — | — | — | 10 | 20 | — | — | — | — | — | — | — | 41 | |
| Cocoa Powder | — | — | — | — | — | — | — | — | 10 | 30 | — | — | — | 10 | 20 | — | |
| Softeners - Non Hydrog. | | | | | | | | | | | | | | | | | |
| Soybean Oil | | | | | | | | | | | | | | | | | |
| Cottonseed Oil | | | | | | | | | | | | | | | | | |
| Palm Oil | — | — | — | — | — | — | 10 | — | — | — | — | — | | | | | |
| Palmkernel Oil | — | — | — | — | — | — | — | — | — | — | — | — | | | | | |
| Coconut Oil | — | — | — | — | — | 10 | — | — | — | — | — | 10 | | | | | |
| Safflower Oil | | | | | | | | | | | | | | | | | |
| Tallow Oil | | | | | | | | | | | | | | | | | |
| Wax | | | | | | | | | | | | | | | | | |
| MD < 600 | — | — | — | — | — | — | — | — | — | — | — | — | — | — | — | — | 68 |
| ME > 600 | — | — | — | — | — | — | — | — | — | — | — | — | — | — | — | — | — |
| Softeners - Part. Hydrog. | ... | ... | ... | ... | ... | ... | ... | ... | | | | | | | | | |
| Soybean Oil | 30 | — | — | 80 | — | — | — | 35 | 50 | — | | | | | | | |
| Cottonseed Oil | — | 20 | 10 | — | 40 | — | 40 | — | — | 20 | — | — | — | — | — | — | 15 |
| Palm Oil | — | — | — | — | — | 10 | — | — | — | — | | | | | | | |
| Palmkernel Oil | — | — | — | — | — | — | — | — | — | — | | | | | | | |
| Coconut Oil | — | — | — | — | — | — | 10 | — | — | — | | | | | | | |
| Safflower Oil | — | — | — | — | — | — | — | — | — | — | | | | | | | |
| Tallow Oil | — | — | — | — | — | — | — | — | — | — | | | | | | | |
| Softeners - Fully Hydrog. | ... | ... | ... | ... | ... | ... | ... | ... | | | | | | | | | |
| Soybean Oil | 50 | — | — | — | 10 | — | — | 20 | — | 50 | — | 35 | — | — | | | |
| Cottonseed Oil | — | 40 | 20 | — | — | 10 | 40 | — | 40 | — | 50 | — | 15 | — | | | |
| Palm Oil | — | — | 10 | — | — | — | — | — | — | — | — | — | — | — | | | |
| Palm Kernel Oil | — | — | — | — | 10 | — | — | — | — | — | — | — | — | — | | | |
| Coconut Oil | — | — | — | 10 | — | — | — | — | — | — | — | — | — | — | | | |
| Safflower Oil | | | | | | | | | 10 | — | | | | | | | |
| Tallow Oil | | | | | | | | | 5 | — | | | | | | | |
| Mono-, Di-, Tri Glyc. | ... | ... | ... | ... | ... | ... | ... | ... | ... | ... | 15 | — | — | 30 | 30 | 59 | 17 |
| Lecithin | | | | | | | | | | | — | 20 | — | — | — | — | — |
| Triacetin | | | | | | | | | | | — | — | 20 | — | — | — | — |

TABLE 2

| EXAMPLES: GUM BASE (in % by weight of base) | | | | | | | | | | | | |
|---|---|---|---|---|---|---|---|---|---|---|---|---|
| EXAMPLE: | 1 | 2 | 3 | 4 | 5 | 6 | 7 | 8 | 9 | 10 | 11 | 12 |
| BASE ID REFEREN. (for our ref) | | | MDC 4042 | | | SMC 4300 | | LG 4119 | | | ALPHA GNDE 4114 | |
| Elastomers | ... | ... | ... | ... | | | | | | | | |
| Butyl | — | 12 | 10 | 9 | 13 | 10 | 11 | — | — | — | — | — |
| SBR | 11 | — | — | — | — | — | — | 9 | 8 | 20 | 8 | 9 |
| PIB | 4 | 8 | 3 | 4 | 6 | 2 | 5 | — | — | — | — | — |
| PVAc Vin. Pol. | | | | | | | | | | | | |
| Mw 12000 | — | 22 | 27 | 22 | — | 27 | 24 | | | | | |
| Mw 30000 | 20 | — | — | — | 16 | — | — | | | | | |
| Mw 52000 | — | — | — | — | — | — | — | | | | | |
| Pre-Blend | ... | ... | ... | ... | | | | | ... | ... | ... | ... |
| 1A-6 | 38 | 29 | 37 | — | — | — | — | | 56 | — | 53 | — |
| 1C-40 | — | 27 | — | — | — | — | — | | 22 | 46 | — | 27 |
| 1A-5 | — | — | — | — | — | 37 | — | | — | — | 8 | — |
| 1A-24 | — | — | — | 23 | — | — | — | | | | | |
| 1D-12 | — | — | — | 34 | — | — | — | | | | | |
| 1C-12 | — | — | — | — | 21 | — | — | | | | | |
| 1E-15 | — | — | — | — | — | — | 41 | — | | | | |
| 1A-3 | — | — | — | — | — | — | — | 56 | | | | |
| Dry Powders | ... | ... | ... | ... | | | | | ... | | ... | ... |
| CaCO3 | — | — | — | — | — | — | — | 16 | — | — | 21 | 21 |
| Talc | — | — | — | — | — | — | — | — | — | 19 | — | — |
| Colorants | 2 | — | — | — | — | — | — | — | — | — | — | — |
| Cocoa Powder | — | — | 1 | — | 1 | — | — | — | — | — | — | — |
| Elast. Plast. | ... | ... | ... | ... | | | | | ... | | ... | ... |
| Rosin Esters | — | — | — | — | — | 15 | 6 | — | | | 8 | 8 |
| Terpene Resins | — | — | — | 39 | — | — | — | — | | | — | — |
| Wax | ... | ... | ... | ... | | | | | ... | | ... | ... |
| >600 mW | 12 | — | 10 | — | — | 10 | — | 6 | 10 | 15 | — | 5 |
| <600 mW | — | — | 2 | — | — | 3 | — | 4 | — | — | — | — |
| Softeners - Fully Hydrog. | ... | ... | ... | ... | ... | | | | ... | ... | ... | ... |
| Soybean Oil | — | — | — | — | — | — | 4 | — | | | | |
| Cottonseed Oil | — | — | 3 | — | — | 2 | — | — | | | | |
| Palm Oil | 4 | 5 | — | — | 3 | — | — | — | | | | |
| Palmkernel Oil | — | — | — | — | — | — | — | — | | | | |
| Coconut Oil | — | — | — | — | — | — | — | — | | | | |
| Softeners - Part. Hydrog. | ... | ... | ... | ... | ... | | | | ... | | ... | ... |
| Soybean Oil | | | | — | | | | | | | | |
| Cottonseed Oil | | | | 6 | | | | | | | | |
| Palm Oil | | | | — | | | | | | | | |
| Palmkernel Oil | | | | — | | | | | | | | |
| Coconut Oil | | | | — | | | | | | | | |
| Softeners - Non-Hydrog. | ... | ... | ... | ... | ... | | | | ... | ... | ... | ... |
| Soybean Oil | 3 | | | — | — | — | — | — | | | | |
| Palm Oil | — | | | 1 | — | — | — | — | | | | |
| Palmkernel Oil | — | | | — | — | — | — | — | | | | |
| Coconut Oil | — | | | 1 | 2 | — | — | — | | | | |
| MCT's | ... | ... | ... | 1 | 2 | — | — | — | ... | ... | ... | ... |
| Mono-/Diglycerides | 6 | 7 | 5 | — | — | 5 | — | 3 | 4 | — | — | — |
| Acetyl. Mono-/Diglycerides | — | 1 | — | — | — | — | — | — | ... | ... | ... | ... |
| Lecithin | — | — | 2 | — | — | 3 | — | — | ... | ... | ... | ... |
| Triacetin | — | — | — | — | — | — | — | — | ... | ... | ... | ... |

Gum formulae may comprise a gum base made in accordance with the present invention in a gum formula typically known to those in the art. Also, pre-blends made in accordance with the present invention may be used during the manufacture of a finished chewing gum. Levels of pre-blend added during the gum processing may range from about 0 to about 40 percent by weight of the gum. Preferably, the pre-blend range is from about 0 to about 25 percent and more preferably from about 0 to about 20 percent.

The water-soluble portion of the chewing gum may comprise softeners, sweeteners, flavoring agents and combinations thereof. The sweeteners often fill the role of bulking agents in the gum. The bulking agents generally comprise from about 5 percent to about 90 percent, preferably from about 20 percent to about 80 percent, and most preferably from about 30 percent to about 60 percent by weight of the gum.

Softeners are added to the chewing gum in order to optimize the chewability and mouth feel of the gum. Softeners, also known in the art as plasticizers or plasticizing agents, generally constitute from about 0.5 percent to about 15.0 percent by weight of the chewing gum. Softeners contemplated for use in chewing gums include glycerin, lecithin and combinations thereof. Further, aqueous sweetener solutions such as those containing sorbitol, hydrogenated starch hydrolysates, corn syrup and combinations thereof may be used as softeners and bulking agents in gum.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

Sugar sweeteners can also be used in combination with sugarless sweeteners. Generally, sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile desired in a chewing gum and shelf-life stability needed, bulk sweeteners can also be used in combination with coated or uncoated high-intensity sweeteners or with high-intensity sweeteners coated with other materials and by other techniques.

High-intensity sweeteners, or artificial sweeteners and peptide sweeteners, typically may include, but are not limited to, alitame, thaumatin, aspartame, sucralose, acesulfame, saccharin and dihydrochalcones. The amount of these sweeteners in chewing gum may range from about 0.02 to 0.10 weight percent for sweeteners such as alitame, thaumatin and dihydrochalcones, and from about 0.1 to about 0.3 weight percent for sweeteners like aspartame, sucralose, acesulfame and saccharin.

A flavoring agent may be present in the chewing gum in an amount within the range of from about 0.1 to about 10.0 weight percent and preferably from about 0.5 to about 3.0 weight percent of the gum. Flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the initial ingredients have been thoroughly mixed, the gum mass is discharged from the mixer and shaped into the desired form such as by rolling into sheets and cutting into sticks, extruded into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

Examples of gum formulas comprising gum bases made with pre-blends are shown in Table 3 and in no way are illustrated to narrow the scope of the present invention.

TABLE 3

Gum Formulas Using Pre-blends:

|  | A | B | C | D | E | F | G | H | I | J |
|---|---|---|---|---|---|---|---|---|---|---|
| Gum Base | 25 | 38 | 22 | 32 | 15 | 43 | 36 | 26 | 32 | 15 |
| Flavor Oil | 0.7 | 1.2 | 1.9 | 1.4 | 0.5 | 1.1 | 1.2 | 1.9 | 1.4 | 0.5 |
| Sugar | 49 | 43 | 30 | — | — | — | 37 | 33 | — | 55 |
| Sorbitol | — | — | — | 44 | 55 | 25 | — | — | 54 | — |
| Corn Syrup | 19 | 12 | 35 | — | — | — | 17 | 38 | — | 13 |
| Hydrogenated Starch Hydrolysate | — | — | — | — | — | — | — | — | — | 8.0 |
| Glycerine | 1.6 | 3.1 | — | 6.4 | 16.5 | 8.0 | 6.1 | — | 9.8 | 8.5 |
| Lecithin | — | 0.7 | — | 2.0 | — | 1.0 | 0.7 | — | 2.5 | — |
| Water | 0.7 | — | — | — | — | — | 2.0 | — | — | — |
| Artificial Sweeteners | — | — | — | 0.2 | — | 0.1 | — | — | 0.3 | — |
| Fruit Acids | — | — | 1.1 | — | — | — | — | 1.1 | — | — |
| Pre-Blend |  |  |  |  |  |  |  |  |  |  |
| 1C-26 | 4 | — | — | — | — | — | — | — | — | — |
| 1E-14 | — | 2 | — | — | — | — | — | — | — | — |
| 1A-3 | — | — | 10 | — | — | — | — | — | — | — |
| 1E-15 | — | — | — | 15 | — | — | — | — | — | — |
| 1B-3 | — | — | — | — | 13 | — | — | — | — | — |
| 1D-7 | — | — | — | — | — | 20 | — | — | — | — |

It is intended that the foregoing detailed description be regarded as illustrative rather than limiting, and that it be understood that the following claims, including all equivalents, are intended to define the scope of this invention.

We claim:

1. A process for manufacturing gum base, comprising:
   a. forming a pre-blend in liquid form in a primary mixer by using
      (i) one or more liquefiable gum base ingredients selected from the group consisting of a wax with a melting point below about 115° C., an elastomer plasticizer having a softening point less than about 115° C., a monoglyceride, a diglyceride, a triglyceride, an acetylated monoglyceride and lecithin; and
      (ii) one or more dry powder ingredients selected from the group consisting of magnesium carbonate, calcium carbonate, magnesium silicate, aluminum silicate, a calcium phosphate, clay and talc;
   wherein the pre-blend has a viscosity in its liquid form less than about $2 \times 10^6$ cps;
   b. transferring a portion of the pre-blend to each of at least two secondary mixers;
   c. introducing an elastomer to the secondary mixers, where the ratio of pre-blend to elastomer ranges from about 1:1 to about 10:1; and
   d. blending the pre-blend and elastomer to form a finished gum base in each of the secondary mixers.

2. The process of claim 1 wherein the pre-blend is transferred in step (b) to the secondary mixers at different times.

3. The process of claim 2 wherein different amounts of elastomer are added in step (c) at each of the different times, so that different gum bases are prepared at those different times using a common pre-blend.

4. The process of claim 3 wherein further addition of one or more of said dry powder ingredients is made in at least one of the secondary mixers.

5. The process of claim 4 wherein further addition of one or more of said liquefiable gum base ingredients is added to at least one of the secondary mixers.

6. The process of claim 4 wherein the further-added dry powder ingredient is blended with the elastomer in the secondary mixers before the pre-blend is added to the secondary mixers.

7. The process of claim 5 wherein the further-added dry powder ingredient and the further-added liquefiable gum base ingredient are blended with the elastomer in the secondary mixers to form an initial mass before the pre-blend is added to the secondary mixers.

8. The process of claim 1 wherein the pre-blend comprises from about 40 percent to about 85 percent by weight of the liquefiable gum base ingredient(s) and from about 15 percent to about 60 percent dry powder ingredient(s).

9. The process of claim 8 wherein the pre-blend comprises from about 45 percent to about 75 percent by weight of liquefiable gum base ingredient(s), and from about 25 percent to about 55 percent of dry power ingredient(s).

10. The process of claim 7 wherein the pre-blend comprises from about 40 percent to about 85 percent by weight of the liquefiable gum base ingredient(s) and from about 15 percent to about 60 percent dry powder ingredient(s).

11. The process of claim 10 wherein the initial mass in the secondary mixers comprise by weight from about 30 to about 60 percent filler, about 20 to about 40 percent elastomer, and from about 10 to about 30 percent elastomer plasticizer.

12. The process of claim 11 wherein the ratio of ingredients in the initial mass in the secondary mixers is about 2:3:1 elastomer: filler: elastomer plasticizer.

13. The process of claim 11 wherein the amount of pre-blend added to each secondary mixer is from about 5 to about 80 percent by weight of the finished gum base.

14. The process of claim 13 wherein the amount of pre-blend added to each secondary mixer is from about 5 to about 70 percent by weight of the finished gum base.

15. The process of claim 13 wherein the amount of pre-blend added to each secondary mixer is from about 10 to about 60 percent by weight of the finished gum base.

16. The process of claim 7 wherein the pre-blend is added stepwise to the secondary mixers.

17. The process of claim 16 wherein the pre-blend is added in 2 to 6 additions to the secondary mixer with mixing between additions.

* * * * *